Patented May 2, 1972

3,660,357
POLY(LACTONEURETHANE) ADHESIVES
Edmond G. Kolycheck, Lorain, Ohio, assignor to The B. F. Goodrich Company, New York, N.Y.
No Drawing. Continuation-in-part of application Ser. No. 664,950, Sept. 1, 1967. This application Oct. 12, 1970, Ser. No. 80,156
Int. Cl. C08g 22/06
U.S. Cl. 260—77.5 AN    5 Claims

ABSTRACT OF THE DISCLOSURE

Polyurethanes prepared from poly(epsilon-caprolactones) having molecular weights from about 1800 to about 2200, less than one mol of an aliphatic glycol and certain aromatic diisocyanates form adhesive materials which are soft and tacky when heated but which on aging harden and crystallize to form tough, crystalline but flexible, bonding agents having good adhesive properties. The poly(lactoneurethanes) are particularly adaptable to providing articles adhered together with excellent structural stability.

CROSS-REFERENCE TO RELATED APPLICATION

This is a continuation-in-part of my copending application, Ser. No. 664,950, filed Sept. 1, 1967 now abandoned.

BACKGROUND OF THE INVENTION

Many adhesives are used in the footwear industry to adhere various parts of the footwear together, particularly the shoe uppers and soles. It is often desirable to separately prepare the uppers and soles and pre-cement, that is, add cement to the uppers and soles at the time they are fabricated for adhering together later. With many adhesives, this introduces difficulties, both in obtaining an adhesive which is not tacky or sticky after application so that the uppers and soles can be stored and otherwise handled before actual adhering of the two shoe portions and in subsequent assembly to obtain an article that can be safely handled before the cement sets and in obtaining a final bond of the desired characteristics. A tough but flexible material binding structural parts together is desired.

SUMMARY OF THE INVENTION

A structural polyurethane adhesive is now provided which may be applied to shoe parts, as uppers and soles, which parts can then be stored without adhering to other shoe parts and when the uppers and soles are to be adhered together, the adhesive layers are heated and pressed together. These polyurethane adhesives exhibit excellent adhesive properties immediately on contact and the resulting shoe structure may be handled without the upper and lower sections separating, and after a short period of time the adhesive changes to a tough, crystalline, but flexible state in final form to provide unitary shoe structures of outstanding structural stability.

The polyurethanes of this invention are reaction products of poly(epsilon-caprolactone) polyesters, an aliphatic diol and certain aromatic diisocyanates and are referred to herein as poly(lactoneurethanes). The molecular weight of the poly(epsilon-caprolactone), for example, the diol, is critical to obtaining the desired tackiness while warm, non-tackiness at room temperature and the ability to crystallize and become hard but flexible after cooling while retaining adhesive properties. The molecular weight of the poly(epsilon-caprolactone)diol must be within the range of about 1800 to about 2200. Less than one mol of aliphatic diol per mole of the poly (epsilon-caprolactone) diol polyester is used. The amount of aromatic diisocyanate used is adjusted so that the molar ratio of total hydroxyl and isocyanate groups are substantially equivalent.

DETAILED DESCRIPTION

The poly(epsilon-caprolactone) diols are known and are the polyester reaction products of lactones and bifunctional compounds having two reactive sites capable of opening the lactone ring. These bifunctional materials may be represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, butanediol-1,4, hexamethylene diol-1,6 and the like. Ethylene glycol provides excellent polyesters.

The lactones preferred for preparing the polyesters are epsilon-caprolactones having the general formula

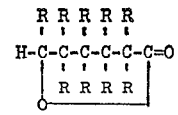

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, γ-methyl-epsilon-caprolactone, β - methyl-epsilon-caprolactone, dimethyl-epsilon-caprolactone and the like. The lactones are polymerized readily by heating with the bifunctional reactant to a temperature of about 100 to about 200° C. Catalysts may be employed if desired. Poly(epsilon-caprolactone)diols having molecular weights in the range of above 1500 to less than 2500 are required. Preferably the poly(epsilon-caprolactone)diols have molecular weights from about 1800 to about 2200, as about 2000. When poly(epsilon-caprolactone)diols having molecular weights less than 1500, as 500 to 1000, are employed, sticky polymers are obtained which have very little tensile strength and do not crystallize and harden. When poly(epsilon-caprolactone)diols having molecular weights greater than 2500 are employed, elastomeric materials are obtained which do not crystallize and which do not provide the desired hard flexible adhesive required for structural applications.

The diisocyanates employed in preparing the polyurethanes are aromatic diisocyanates including, for example, diphenyl methane-p,p'-diisocyanate, dichlorodiphenyl methane diisocyanate dimethyldiphenyl methane diisocyanate, bibenzyl diisocyanate, diphenyl ether diisocyanates, bitolylene diisocyanates and the like of the formula

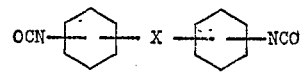

wherein X may be a valence bond; an alkylene radical containing 1 to 5 carbon atoms; NR where R is an alkyl radical; oxygen; sulfur; sulfoxide; sulfone and the like.

The molar ratio of total poly(epsilon-caprolactone) diol and aliphatic diol to aromatic diisocyanate should be essentially 1:1 molar equivalents so that there is no substantial excess of isocyanate nor of terminal hydroxyl groups remaining. The preferred polyurethanes are prepared with substantially equimolar amounts of aromatic diisocyanates and poly(epsilon-caprolactone)diol-aliphatic glycols and there should be less than 10% excess of any reactant.

From about 0.1 to less than one mol of an aliphatic diol or glycol containing 2 to 10 carbon atoms, for example ethylene glycol, propanediol-1,3 and 1,2, butanediol-1,4, hexamethylenediol-1,6 and the like are used. The added glycol should not be used in amounts greater than one mol because the resulting polyurethanes have a very slow crystallization rate and do not reach the degree of adhesive hardness required for applications of structural adhesives of this nature. Excellent results are obtained within the range of about 0.4 to 0.8 mol.

In preparing the polyurethanes of the examples a standard procedure was followed. Essentially one mol of poly(epsilon-caprolactone)diol was melted in a reactor and stirred at a pressure of 5 to 6 mm. at about 150° C. The additional glycol is added at this stage. To this mixture there was then added the aromatic diisocyanate, with stirring to obtain complete mixing and reaction. Reaction temperatures between about 100 and 260° C. have been employed with equivalent longer reaction times at lower temperatures.

The poly(lactoneurethanes) for successful applications as structural adhesives are substantially linear and non-cross-linked and will normally have a Shore A hardness of greater than about 75, preferably above about 90, after being aged at room temperature for 24 hours. Such materials, which crystallize after short periods of aging, will also have excellent adhesive properties while warm and before and after crystallizing. The adhesives may be applied to surfaces to be adhered together from solutions such as dimethylformamide. Such surfaces may be heated to dry the cement. The polyurethanes also will be applied in the form of films or tape and heated to induce adhesion to the desired surface. When the surfaces are to be adhered together, they are heated to temperatures in the range of 125° F. to 180° F. to soften the poly(lactoneurethane) and pressed on together. The poly(lactoneurethanes) of this invention have excellent adhesive properties immediately upon contact and readily crystallize within a period of about 24 hours to form the desired hard flexible structural adhesive. In the examples which follow, increase in hardness on aging at room temperature is an indication of the crystallization of the polyurethane.

Example I

A poly(lactoneurethane) was prepared by the procedure described above from a mixture of one mol of poly(epison-caprolactone)diol having a molecular weight of 2060, 0.6 mol of butanediol-1,4 and 1.6 mols of 4,4'-diphenylmethane diisocyanate. The resulting polymer had a tensile strength of 4320 p.s.i., an elongation of 790% and a 300% modulus of 630 p.s.i. This polyurethane was soluble in methylethylketone. The crystallization rate of the polymer was determined by first compression molding a sample of the polyurethane to obtain a sheet 6 x 6 x 0.075 inches. A 2 x 1 inch test specimen was cut from this sheet and heated in an air oven for 15 minutes at 150° F. The sample was taken from the oven, cooled at room temperature between two aluminum plates for five minutes and the hardness determined with a Shore A Durometer (ASTM D676–55T) at intervals to determine the increase in hardness, which in turn reflects degree of crystallization of the poly(lactoneurethanes). The following crystallization or hardening rate was obtained.

TABLE I

| Time hours: | Shore A hardness |
|---|---|
| 0 | 53 |
| 1 | 53 |
| 5 | 56 |
| 15 | 75 |
| 24 | 83 |
| 48 | 95 |

This poly(lactoneurethane) was tested for adhesive properties in accordance with ASTM D–903 by cutting portions of plasticized polyvinyl chloride coated fabric (for shoe upper construction) and a flexible vinyl shoe sole stock into 1 x 6 inch sections and a surface of each was wire brushed. A solution of 20% of the poly(lactoneurethane) in tetrahydrofuran was prepared and one side of each of the test surfaces coated with the cement and allowed to dry for 24 hours at room temperature. These surfaces did not adhere to each other or the shoe sections on simple pressure contact. The test samples were then heated at 180° F. in an infrared oven for 1.5 minutes, pressed together and held for 24 hours at room temperature. The samples were then tested for adhesive properties on the Thwing-Albert tester with a 50 pound weight at a speed of 12 inches per minute. The bond between fabric-plastic stock and flexible vinyl sole stock had a peel bond strength of 43 pounds per inch.

Polyurethanes made with polylactones of molecular weights of about 500, 800 and 2800 have Shore A hardness values after 24 hours of less than 65, remain soft and rubbery, do not crystallize and are unsatisfactory as tack adhesives. Very low peel bond strength values are obtained with such materials.

Example II

Several alkylene glycols are reacted with the poly(epsilon-caprolactone)diol and aromatic diisocyanate. In preparing these samples, the alkylene glycol was mixed with the polylactone as is described hereinabove. In each sample, 0.6 mol of glycol and 1.6 mols of diphenyl methane-p,p'-diisocyanate per mol of poly(epsilon-caprolactone)diol were reacted together. The physical properties and crystallization rate of the three samples are set forth in Table II.

TABLE II

| | Sample number | | |
|---|---|---|---|
| | 1 | 2 | 3 |
| Alkylene glycol | Ethylene glycol | Butane-diol-1,4 | Hexane-diol-1,6 |
| Tensile strength (p.s.i.) | 2,000 | 3,600 | 2,250 |
| Elongation (percent) | 700 | 700 | 800 |
| 300% modulus (p.s.i.) | 700 | 900 | 600 |
| Hardness: | | | |
| Shore A | 95 | 90 | 92 |
| Shore D | 37 | 36 | 31 |
| Crystallization rate, hours (Shore A hardness): | | | |
| 0 | 35 | 59 | 43 |
| 0.5 | 50 | | 65 |
| 1 | 60 | 60 | |
| 2 | 90 | | 85 |
| 3 | 94 | 67 | 88 |
| 5 | 95 | 68 | 90 |
| 12 | 95 | 82 | 92 |
| 24 | 95 | 90 | 92 |

Each of these poly(lactoneurethanes) have suitable physical properties, crystallization rate and adhesive properties to be useful adhesives in structural composites.

Example III

Less than one mol of glycols per mol of poly(epsilon-caprolactone)diol is required. When more than one mol of such glycol is employed, the crystallization rate of the resulting poly(lactoneurethane) is quite slow and such poly(lactoneurethanes) normally, do not develop the hardness desired for useful structural adhesives. A series of poly(lactoneurethane(s) prepared with varying amounts of butanediol-1,4 were prepared to demonstrate this. The poly(lactoneurethanes) prepared with varying amounts of about 2000, and diphenyl-methane-p,p'-diisocyanate was used in a molar ratio equivalent to the total mols of polylactone and glycol. The mol ratio of butanediol-1,4 per mol of poly(epsilon-caprolactone)diol, the physical properties and crystallization rates are set forth in Table III.

TABLE III

| Sample number | 1 | 2 | 3 |
|---|---|---|---|
| Mol butanediol-1,4 | 0.6 | 0.9 | 1.0 |
| Tensile strength (p.s.i.) | 3,600 | 2,200 | 3,800 |
| Elongation (percent) | 700 | 630 | 730 |
| 300% modulus (p.s.i.) | 900 | 800 | 500 |
| Hardness: | | | |
| Shore A | 90 | 92 | 75 |
| Shore D | 36 | 35 | 21 |
| Crystallization rate, hours (Shore A hardness): | | | |
| 0 | 59 | 45 | 60 |
| 0.5 | --- | 55 | 65 |
| 1 | 60 | 65 | 66 |
| 3 | 67 | 68 | 66 |
| 5 | 68 | 70 | 70 |
| 12 | 82 | 78 | 70 |
| 24 | 90 | 85 | 70 |

Even after 48 hours aging time the Shore A hardness of Sample 3 made with butanediol-1,4 was only 71. When Sample 3 was repeated except that the polylactone had a molecular weight of 2834, this poly(lactoneurethane) did not crystallize and had unsatisfactory peel bond strength.

The poly(lactoneurethane) adhesives find many other applications in shoe construction, for example, in adhering leather uppers to flexible vinyl shoe sole stock wherein the vinyl may be polyvinyl chloride and copolymers of polyvinyl chloride; in adhering uppers formed from polyvinyl chloride coated fabrics and shoe sole stock prepared from mixtures of SBR rubber and styrene-butadiene resin; in adhering leather to leather; in adhering other plastics to metal, wood and paper and the like. The poly(lactone-urethanes) may be compounded by methods and with ingredients known to those skilled in the art and fillers, stabilizers, colorants, other resins for example, epoxy resins, phenoxy resins, chlorinated rubber and the like may be mixed with the poly(lactoneurethane).

I claim:

1. A crystallizable polyurethane flexible adhesive which has a Shore A hardness of greater than about 75 after aging at room temperature for 24 hours comprising the reaction product of a poly(epsilon-caprolactone)diol having a molecular weight in the range of about 1800 to about 2200, about 0.1 to less than one mol, per mol of poly(epsilon-capolactone)diol, of an aliphatic glycol containing 2 to 6 carbon atoms, and 4,4'-diphenylmethane diisocyanate, the molar ratio of the total of glycol and diol to diisocyanate being substantially equivalent.

2. A polyurethane of claim 1 wherein the poly(epsilon-caprolactone)diol is a reaction product of epsilon-caprolactone or methyl epsilon-caprolactone and ethylene glycol and the aliphatic glycol is present in amount from 0.2 to less than 0.8 mol per mol of poly(epsilon-caprolactone)diol.

3. A polyurethane of claim 2 wherein the molecular weight of the poly(epsilon-caprolactone)diol is about 2000 and the glycol is 0.4 to 0.8 mol of 1,4-butanediol.

4. A polyurethane of claim 2 wherein the molecular weight of the poly(epsilon-caprolactone)diol is about 2000 and the glycol is 0.4 to 0.8 mol of ethylene glycol.

5. A polyurethane of claim 2 wherein the molecular weight of the poly(epsilon-caprolactone)diol is about 2000 and the glycol is 0.4 to 0.8 mol of hexanediol-1,4.

References Cited

UNITED STATES PATENTS 2,933,477  4/1960  Hostettler.
3,523,101  8/1970  Reuter _____ 260—47

FOREIGN PATENTS 1,149,791  4/1969  Great Britain.
1,479,785  5/1967  France.

DONALD E. CZAJA, Primary Examiner

H. S. COCKERAM, Assistant Examiner

U.S. Cl. X.R.

161—190; 260—32.6, 77.5 AT, 858, Dig. 35